United States Patent
Tsuda et al.

(10) Patent No.: US 7,147,922 B2
(45) Date of Patent: Dec. 12, 2006

(54) VINYLIDENE FLUORIDE COPOLYMER RESIN FILM

(75) Inventors: Nobuhiko Tsuda, Settsu (JP); Keisuke Matsumoto, Settsu (JP); Masaki Takakura, Settsu (JP); Ken Okanishi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 28 days.

(21) Appl. No.: 10/895,945

(22) Filed: Jul. 22, 2004

(65) Prior Publication Data

US 2005/0019584 A1 Jan. 27, 2005

(30) Foreign Application Priority Data

Jul. 25, 2003 (JP) ............................. 2003-280088

(51) Int. Cl.
 *B32B 27/30* (2006.01)
 *C08L 27/16* (2006.01)

(52) U.S. Cl. ..................... 428/421; 428/522; 525/199

(58) Field of Classification Search ................ 525/199; 428/421, 522; 526/206
See application file for complete search history.

(56) References Cited

U.S. PATENT DOCUMENTS 6,635,714 B1 * 10/2003 Wood et al. ................. 525/199

* cited by examiner

*Primary Examiner*—Ramsey Zacharia
(74) *Attorney, Agent, or Firm*—Sughrue Mion, PLLC

(57) ABSTRACT

There are provided a resin film being excellent in blocking resistance, scratch resistance, transparency, water resistance and chemical resistance and a member having the resin film as an outermost layer. The resin film comprises a vinylidene fluoride (VdF) copolymer and an acrylic polymer as essential components, in which a heat of fusion of crystal derived from the VdF copolymer in the resin film is from 15 to 30 J/g when measured with a differential scanning calorimeter (DSC), and light transmittance (light transmittance at 600 nm of 50 μm thick resin film) is not less than 85%. The member has the resin film as an outermost layer.

16 Claims, No Drawings

VINYLIDENE FLUORIDE COPOLYMER RESIN FILM

BACKGROUND OF THE INVENTION

The present invention relates to a resin film comprising a vinylidene fluoride copolymer and an acrylic polymer as essential components. This resin film is excellent in blocking resistance, scratch resistance, transparency, water resistance and chemical resistance.

A resin film comprising a vinylidene fluoride copolymer (for example, a copolymer of vinylidene fluoride (VdF) and tetrafluoroethylene (TFE)) and an acrylic polymer (for example, polymethyl methacrylate) as essential components has been widely known, and also a transparent film made of such a resin film is known (for example, JP10-120801A).

Also coating with a coating composition comprising a vinylidene fluoride copolymer and an acrylic polymer as essential components for members for transportation cars (JP2001-49194A) and members for building (WO95/08582) is known well.

In the conventional coating and film comprising a vinylidene fluoride copolymer and an acrylic resin, a VdF-TFE copolymer having a VdF content of from about 70% by mole to about 90% by mole and a crystalline melting point of from 120° to 240° C. is used from the viewpoint of solubility in a solvent and compatibility with acryl, and a transparent film is obtained by blending the VdF-TFE copolymer to an acrylic resin containing not less than 50% by mole of methyl methacrylate. However this resin film comprising a vinylidene fluoride copolymer and an acrylic polymer as essential components is inferior in blocking resistance and has a problem that when the outside temperature is high, hardness of the film is lowered or when a load is applied on the film, craters remain.

When the melting point of the vinylidene fluoride copolymer is increased to solve this problem, a softening point of the resin film obtained from the copolymer and an acrylic polymer is increased but there is a problem that solubility in a solvent is lowered and further transparency of the resin film is also lowered.

Also there is known a method of crosslinking polymers in a resin film to improve blocking resistance. However in that case, there is a problem that adhesion at laminating the resin film on other material is lowered, and also extrusion moldability and welding resistance are lowered.

SUMMARY OF THE INVENTION

Under such circumstances, an object of the present invention is to provide a resin film being excellent in blocking resistance, scratch resistance, transparency, water resistance and chemical resistance and a member having the resin film as an outermost layer.

The present inventors have made intensive studies, and as a result, have found that the above-mentioned problems can be solved by a resin film comprising a vinylidene fluoride (VdF) copolymer and an acrylic polymer as essential components, in which a heat of fusion of crystal derived from the VdF copolymer in the resin film is from 15 to 30 J/g when measured within a temperature range of from 0° C. to 200° C. with a differential scanning calorimeter (DSC) using 10 mg of sample at a temperature elevating rate of 10° C./min, and light transmittance (light transmittance at 600 nm of 50 μm thick resin film, hereinafter the same) is not less than 85%.

Example of the above-mentioned VdF copolymer is preferably a copolymer comprising VdF, TFE and a monomer as an optional component copolymerizable therewith. Particularly preferred is a copolymer having a VdF content of from 70 to 98% by mole, further preferably from 70 to 78% by mole or from 82 to 92% by mole.

It is also preferable that the above-mentioned VdF copolymer is a polymer obtained by dispersion polymerization in the presence of a fluorine-containing solvent.

It is preferable that the content of VdF copolymer in the resin film of the present invention is from 70 to 90% by weight.

The present invention further relates to a member which has the above-mentioned resin film as an outermost layer and is excellent in blocking resistance.

DETAILED DESCRIPTION

The VdF copolymer which is used in the present invention is a copolymer in which when the VdF copolymer is mixed with an acrylic polymer and formed into a resin film, a heat of fusion (measured with DSC) of crystal derived from the VdF copolymer in the resin film is from 15 to 30 J/g and light transmittance is not less than 85%.

The VdF copolymer is one comprising VdF and other one or two or more monomers. Examples of the other monomer are perfluoro olefins such as TFE, perfluoro(alkyl vinyl ether) (PAVE) and hexafluoropropylene (HFP), chlorotrifluoroethylene (CTFE) and the like. Among them, from the viewpoint of excellent weather resistance and heat resistance, perfluoro olefins are preferred, and particularly preferred is TFE.

Concretely there are, for example, VdF-TFE copolymer, VdF-HFP copolymer, VdF-TFE-HFP terpolymer, VdF-TFE-CTFE terpolymer and the like.

The content of VdF in the VdF-TFE copolymer is preferably from 70 to 98% by mole to obtain the above-mentioned heat of fusion of crystal of from 15 to 30 J/g. The VdF content of less than 70% by mole is not preferred because there is less effect of improving blocking resistance of the resin film obtained by mixing with an acrylic polymer. The VdF content exceeding 98% by mole is not preferred because transparency of the obtained film is lowered. A particularly preferred VdF content is from 70 to 78% by mole or from 82 to 92% by mole. If the VdF content is more than 78% by mole and less than 82% by mole, effects are somewhat inferior because kind and amount of the acrylic resin to be blended are limited to a narrow range.

In the present invention the VdF copolymer can be prepared by any of conventional solution polymerization method, suspension polymerization method (dispersion polymerization method) and emulsion polymerization method, and also a polymerization initiator can be optionally selected from usual polymerization initiators depending on the polymerization method.

Examples of the polymerization initiator are, for instance, organic peroxides such as bis(chlorofluoroacyl) peroxide, bis(perfluoroacyl) peroxide, bis(ω-hydroperfluoroacyl) peroxide, t-butyl peroxyisobutyrate and diisopropyl peroxydicarbonate; azo compounds such as azobisisobutyronitrile; and the like. An amount of the polymerization initiator can be optionally changed depending on kind thereof, conditions for polymerization reaction and the like and is usually from 0.005 to 5% by weight, particularly from about 0.05% by weight to about 0.5% by weight based on the whole monomers polymerized.

Conditions for polymerization reaction are not limited particularly and wide range of reaction conditions can be adopted. For example, an optimum polymerization reaction temperature can be selected depending on kind of the polymerization initiator, etc. and is usually from 0° C. to about 100° C., particularly from about 30° C. to about 90° C. A reaction pressure can also be selected optionally and is usually from 0.1 to 5 MPa, particularly from about 0.5 MPa to about 3 MPa. In preparing the VdF copolymer which is used in the present invention, polymerization can be carried out advantageously under the above-mentioned reaction pressure and may be carried out under higher pressure or on the contrary, even under reduced pressure. Also the polymerization can be carried out batchwise or continuously.

Also a chain transfer agent can be used for the purpose of adjusting a molecular weight of the VdF copolymer, and usual chain transfer agents can be used. Examples thereof are, for instance, hydrocarbons such as n-hexane and cyclohexane; aromatic compounds such as toluene and xylene; ketones such as acetone; acetic acid esters such as ethyl acetate and butyl acetate; alcohols such as methanol and ethanol; mercaptans such as methyl mercaptan; and the like. An adding amount of the chain transfer agent can be changed depending on a chain transfer constant of the compound to be used, and is usually within a range of from 0.01 to 20% by weight based on the polymerization solvent.

For the polymerization, usual solvents in the form of liquid can be used depending on the polymerization method. In preparing the VdF copolymer which is used in the present invention, suspension polymerization (dispersion polymerization) in the presence of a fluorine-containing solvent is preferred since transparency and heat resistance of the obtained resin film are excellent.

A lower limit of the weight average molecular weight of the VdF copolymer which is used in the present invention is 10,000, preferably 50,000, and an upper limit thereof is 300,000, preferably 200,000. An upper limit of a crystalline melting point is 200° C., preferably 150° C. when measured within a temperature range of from 0° C. to 250° C. at a temperature elevating rate of 10° C./min using 10 mg of sample, and a lower limit thereof is 100° C., preferably 120° C. Also a heat of fusion of crystal (measured with DSC) of the VdF copolymer alone is from 15 to 30 J/g, preferably from 20 to 30 J/g, particularly preferably from 20 to 25 J/g.

The acrylic polymer which is an another component constituting the resin film of the present invention is then explained below.

Examples of the acrylic polymer are homopolymers or copolymers of alkyl acrylates having C1 to 18, more concretely acrylic acid esters such as methyl acrylate, ethyl acrylate, propyl acrylate, n-butyl acrylate, isobutyl acrylate, 2-ethylhexyl acrylate and lauryl acrylate; alkyl methacrylates having C1 to 18, more concretely methacrylic acid esters such as methyl methacrylate, ethyl methacrylate, propyl methacrylate, n-propyl methacrylate, isobutyl methacrylate, cyclohexyl methacrylate and lauryl methacrylate, and copolymers thereof with other copolymerizable monomers. Examples of the other copolymerizable monomer are, for instance, α-olefins such as ethylene, propylene and isobutylene; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and allyl ether; vinyl esters such as vinyl acetate, vinyl lactate, vinyl butyrate, vinyl pivalate, vinyl benzoate, VEOVA9 and VEOVA10 (products of SHELL); aromatic vinyl compounds such as styrene, α-methyl styrene and p-tert-butyl styrene; acrylonitrile; and the like. Among them, preferred are homopolymers of (meth) acrylic acid esters such as methyl methacrylate and ethyl acrylate, particularly polymethyl methacrylate (PMMA) from the viewpoint of high transparency and excellent heat resistance when blending with the VdF copolymer.

A lower limit of the weight average molecular weight of the acrylic polymer which is used in the present invention is 5,000, preferably 10,000, and an upper limit thereof is 300,000, preferably 200,000.

The resin film of the present invention can be obtained by forming a mixture of the above-mentioned VdF copolymer and acrylic polymer into a film.

In the present invention, the "resin film" encompasses a single membrane film and a coating film. The coating film is a layer formed on a substrate by a method such as coating. Both of the single membrane film and coating film may be in the form of mono-layered structure or in the form of multi-layered structure (laminated film).

A method of mixing the VdF copolymer and acrylic polymer is not limited particularly. For example, the respective polymers may be mixed in the form of solution or emulsion or in a molten state. Preferred is the method of mixing in the form of solution from the viewpoint of uniform mixing.

With respect to a preferred mixing ratio of the VdF copolymer to the acrylic polymer, the proportion of the VdF copolymer in the resin film is not less than 70% by weight, preferably not less than 75% by weight and not more than 90% by weight, preferably not more than 85% by weight. A lower limit of the proportion of the VdF copolymer of less than 70% by weight is not preferred because blocking resistance is lowered. When the lower limit is not less than 75% by weight, blocking resistance is enhanced more. An upper limit thereof exceeding 90% by weight is not preferred because transparency of the film is lowered. An upper limit of not more than 85% by weight is more preferred because there is less lowering of transparency of the film at high temperature.

The so-obtained resin film of the present invention can be in various forms as mentioned above, and even in any of forms, a heat of fusion (measured with DSC) of crystal derived from the VdF copolymer in the resin film is from 15 to 30 J/g and light transmittance is not less than 85%.

If the heat of fusion of crystal derived from the VdF copolymer in the resin film is lower than 15 J/g, blocking resistance becomes insufficient, and if the heat of fusion is higher than 30 J/g, transparency is lowered. Therefore the both cases are not preferred. A preferred lower limit of the heat of fusion of crystal derived from the VdF copolymer in the resin film is 15 J/g, more preferably 20 J/g, and a preferred upper limit is 30 J/g, more preferably 25 J/g.

Even when the content of VdF copolymer is within the above-mentioned range, there is a case where the heat of fusion of crystal derived from the VdF copolymer in the resin film is lower than 15 J/g. In such a case, when the resin film is subjected to heat treating (annealing) after forming into a film, crystallization of the VdF copolymer in the resin film can be advanced and the heat of fusion of crystal derived from the VdF copolymer can be increased to 15 J/g or more. Similarly even when the content of VdF copolymer is smaller than 60% by weight, when heat treating is carried out, the heat of fusion of crystal derived from the VdF copolymer in the resin film can be increased to 15 J/g or more.

It is preferable that the heat treating is carried out by allowing the resin film to stand at a temperature within the range of from a temperature lower than the melting point of the VdF copolymer by 10° C. (mp −10° C.) to 40° C. for 0.1 to 6 hours, preferably 0.1 to 2 hours.

The light transmittance at 600 nm is a factor for evaluating transparency of the resin film and need be not less than 85%. If the light transmittance is lower than 85%, the film is seen as if it is turbid in white when viewing with naked eyes. Preferred light transmittance is not less than 90%, and an upper limit is 100%.

Besides the VdF copolymer and acrylic polymer, other known polymer and additives may be blended as far as an intended effect of the present invention is not lowered. Examples of the additives are glass filler, carbon nano tube, nano silica and the like. Examples of the nano-silica are powder silica having an average particle size of from 10 to 100 nm, preferably from 20 to 50 nm or a nano-silica dispersion obtained by dispersing nano-silica in an organic solvent such as alcohol, ketone or aromatic solvent at a concentration of from 10 to 50% by weight. The nano-silica can be dispersed in the film of the present invention by directly dispersing in the molten resin composition or uniformly dispersing in the resin solution and then distilling off the solvent.

The resin film of the present invention can be produced by various methods. For example, the single membrane film in the form of multi-layered structure can be prepared by applying the resin solution or dispersion to a substrate by a method such as casting, doctor blade coating, roll coating, dipping or spraying and then drying. After drying, when the dried film is peeled off from the substrate, the single membrane film in the form of mono-layered structure can be obtained. The single membrane film in the form of mono-layered structure can also be prepared from the resin mixture by a method such as melt-extrusion, calendering or blowing. The single membrane film in the form of multi-layered structure, particularly the laminated film can be prepared by co-extrusion of the resin mixture with other resin for substrate, or by press-adhering the single membrane film to other resin film with heating or irradiation of electron beam.

A thickness of the resin film is not limited particularly. Since transparency is lowered when the film is too thick, the thickness is usually not more than 1 mm, preferably not more than 100 μm. When the film is formed by coating, a thin film of usually not less than 5 μm can be produced.

The resin film of the present invention is excellent in blocking resistance, scratch resistance, transparency, water resistance and chemical resistance and therefore the member having the resin film of the present invention as an outermost layer is also excellent in blocking resistance, scratch resistance, transparency, water resistance and chemical resistance.

For forming the resin film of the present invention as the outermost layer, there may be employed a method of adhering a single membrane film on a product directly or through an adhesive, a method of applying the resin coating composition to a product to make a coating film, or a method of co-extrusion with other resin for substrate.

Examples of the member having the resin film as an outermost layer are, for instance, various products made of metal, various resins, ceramics and wood.

EXAMPLE

The present invention is then explained by means of Examples and Preparation Examples, but is not limited to them.

Preparation Example 1

(Synthesis by Suspension Polymerization)

After a 6-liter glass-lined autoclave was charged with 2,000 g of de-ionized water, application of pressure with nitrogen gas and de-airing were repeated three times to remove dissolved oxygen. Then after introducing 2,000 g of octafluorocyclobutane (PFC C-318) under reduced pressure, the inside temperature was maintained at 45° C. with stirring and a gas mixture of VdF/TFE (75/25% by mole ratio) was introduced under pressure to maintain the pressure inside the autoclave at 1.3 MPa.

Then immediately after 6 g of ethyl acetate and 4 g of a 50% methanol solution (NPP50M) of di-n-propylperoxy dicarbonate as a polymerization initiator were introduced under pressure, a reaction was initiated. Since the inside pressure was lowered with the advance of the reaction, the gas mixture of VdF/TFE (70/30% by mole ratio) was additionally introduced under pressure to maintain the pressure inside the autoclave at 1.3 MPa. After completion of 5-hour reaction, the stirring was stopped, and un-reacted monomer and PFC C-318 were purged to terminate the reaction.

A white powder generated in the autoclave was washed with water and dried at 120° C. for 12 hours to obtain 300 g of a VdF/TFE copolymer. According to the NMR analysis, the VdF/TFE ratio was 68/32 (% by mole). Measurement with DSC was carried out under the following conditions to determine a melting point and heat of fusion of crystal.

(Conditions of Measurement with DSC)
Temperature elevating and cooling rate: 10° C./min
Amount of sample: 10 mg
Temperature range: from 0° C. to 250° C.
Measuring cycle: 1st temperature elevation run→1st cooling→2nd temperature elevation run A crystalline melting peak temperature derived from the VdF copolymer at the 2nd temperature elevation run is assumed to be a melting point. Also an amount of heat absorption obtained from an area of crystalline melting peak is assumed to be a heat of fusion of crystal as $\Delta H_{TV}$.

As a result of the measurement with DSC, the melting point of the obtained copolymer was 162° C. and the heat of fusion of crystal was 42 J/g.

Also a molecular weight (weight average) based on styrene which was obtained by gel permeation chromatography (GPC) was 140,000. Equipment used was HLC-8010 available from Toso Kabushiki Kaisha. Tetrahydrofuran (THF) was used as a moving phase, and three styrene-divinylbenzene copolymer columns 4HXL, 3HXL and GMHXL were used.

Preparation Examples 2 to 7

VdF copolymers of Preparation Examples 2 to 7 were prepared in the same manner as in Preparation Example 1 except that the polymerization conditions were changed, respectively as shown in Table 1. Also proportions of monomers, melting points, heat of fusion of crystal and molecular weight of the VdF copolymers which were measured in the same manner as in Preparation Example 1 are shown in Table 1.

Preparation Example 8

(Synthesis by Emulsion Polymerization)

After a 3-liter stainless steel autoclave was charged with 1,500 g of de-ionized water and 3 g of ammonium salt of perfluorooctanoic acid as an emulsifying agent, application of pressure with nitrogen gas and de-airing were repeated three times to remove dissolved oxygen. Then the inside temperature was maintained at 80° C. with stirring and a gas mixture of VdF/TFE of 90/10% by mole ratio was introduced under pressure to maintain the pressure inside the autoclave at 1.3 MPa.

Then immediately after 2 g of ethyl acetate and 3 g of 10% aqueous solution of ammonium persulfate as a polymerization initiator were introduced under pressure, a reaction was initiated. Since the inside pressure was lowered with the advance of the reaction, the gas mixture of VdF/TFE (90/10% by mole ratio) was additionally introduced under pressure to maintain the pressure inside the autoclave at 1.3 MPa. After completion of 6-hour reaction, the stirring was stopped, and un-reacted monomer was purged to terminate the polymerization.

To a white dispersion produced in the autoclave was added 500 g of a 10% aqueous solution of ammonium carbonate for coagulation, and after the obtained polymer was washed with water and dried at 120° C. for 12 hours, 240 g of a copolymer was obtained. Proportions of monomers, melting point, heat of fusion of crystal and molecular weight of the VdF copolymer which were measured in the same manner as in Preparation Example 1 are shown in Table 1.

Example 1

Into a 100 ml glass vessel were poured 36 g of methyl ethyl ketone, 4 g of methylcarbitol acetate, 12.6 g of VdF copolymer obtained in Preparation Example 3 and 5.4 g of polymethyl methacrylate (trade name PARALOID A-21 available from Rhom & Haas), and the mixture was stirred at 50° C. for two hours to obtain a solution of resin mixture. This solution of resin mixture was cooled to 25° C. and then spread over a polyester film with a doctor blade and dried at 150° C. for five minutes so that a dried film thickness became 50 µm. Thus a resin film was produced.

With respect to the resin film, the following items were measured. The results are shown in Table 2.

(Heat of Fusion of Crystal $\Delta H_{MIX}$ Derived from VdF Copolymer)

Measurement is conducted with DSC under the same conditions as in Preparation Example 1. A crystalline melting peak derived from the VdF copolymer appears around the melting point of the VdF copolymer shown in Table 1. The crystalline melting peak of Preparation Example 3 appears around 132° C.

(Blocking Resistance)

Each film is cut to a size of 50×50 mm and the obtained two films are overlapped each other. A weight (500 g) of 40 mm diameter having a smooth bottom surface is placed on the overlapped films, followed by allowing to stand at 70° C. for two hours in a constant temperature vessel. Then blocking resistance is evaluated according to ASTM D3003-94. The evaluation is conducted by the following 5-graded criteria.

10: There is no fusion and two films can be peeled without any force (films are not deformed).

8: There is slightly tackiness, but the films can be easily peeled by hand with a little force (films are not deformed).

TABLE 1

|  | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 |
| --- | --- | --- | --- | --- | --- | --- | --- | --- |
| Water (g) | 2000 | 2000 | 2000 | 2000 | 2000 | 2000 | 2000 | Emulsion polymerization |
| PFC C-318 (g) | 2000 | 2000 | 2000 | 2000 | 2000 | 2000 | 2000 | — |
| Ethyl acetate (g) | 6 | 6 | 6 | 6 | 6 | 2 | 2 | — |
| NPP50M (g) | 4 | 4 | 4 | 4 | 4 | 4 | 4 | — |
| Initial proportions of monomers (% by mole) | 75/25 | 82/18 | 93/7 | 90/10 | 91/9 | 95/5 | 100/0 | 90/10 |
| Proportions of monomers introduced continuously (% by mole) | 70/30 | 75/25 | 80/20 | 90/10 | 90/10 | 95/5 | 100/0 | 90/10 |
| Reaction time (Hr) | 5 | 7 | 15 | 9 | 10 | 10 | 10 | 6 |
| Yield of polymer (g) | 300 | 360 | 520 | 340 | 375 | 280 | 200 | 240 |
| Proportions of monomers (% by mole) | 68/32 | 75/25 | 80/20 | 88/12 | 90/10 | 95/5 | 100/0 | 88/12 |
| Crystalline melting point (° C.) | 162 | 144 | 132 | 145 | 147 | 151 | 167 | 135 |
| $\Delta H_{TV}$ (J/g) | 42 | 36 | 32 | 38 | 34 | 36 | 56 | 37 |
| Molecular weight (weight average) Mw | 140,000 | 320,000 | 142,000 | 140,000 | 155,000 | 180,000 | 170,000 | 120,00 |

6: The films can be peeled by hand with force (films are not deformed).
4: The films can be peeled by hand with force (films are deformed).
2: A tool such as a spatula is needed for peeling the films (films are deformed).
0: The films cannot be peeled.

For practical use, the evaluation of grade 6 or more is necessary.

(Light Transmittance)

A 50 μm thick resin film is irradiated with light having a wavelength of 600 nm and light transmittance is measured with a spectrophotometer (U-3310 available from Hitachi, Ltd.). In order for the resin film to be useful as a transparent film, light transmittance of not less than 85%, preferably not less than 90% is necessary.

(Scratch Resistance)

A test is carried out using a scratch resistance tester (with a rod of 1.6 mm diameter having a 3.2 mm bend at its end) complying with ASTM D5178-98. A load is increased in increments of 0.5 kg and a load (kg) at which craters remain on the film surface is determined. For practical use, scratch resistance of not less than 1.5 kg is necessary.

(Hot Water Resistance)

The film is dipped in 80° C. hot water for two hours and is then taken out. Light transmittance (at 600 nm) of the film is measured according to the method mentioned above. In order for the resin film to be useful for practical use, it is necessary that even after the test, light transmittance of not less than 80%, preferably not less than 85% is maintained.

(Resistance to Gasoline)

After dipping the resin film for one minute in gasoline prescribed in JIS K2202, the film is taken out and a change in appearance of the film is evaluated with naked eyes.

When changes such as lowering of a surface gloss and whitening of the film are not recognized, the film is evaluated as having passed the test, and when such changes are recognized, the film is evaluated as having failed to pass the test.

Examples 2 to 3 and Comparative Examples 1 to 3

Solutions of resin mixture were prepared in the same manner as in Example 1 except that kind and amount of VdF copolymer and an amount of PMMA were changed as shown in Table 2. The obtained solutions of resin mixture were cooled to 25° C. and then spread over a polyester film with a doctor blade and dried at 150° C. for five minutes so that a dried film thickness became 50 μm. Thus resin films were produced.

With respect to those resin films, the same items as in Example 1 were measured in the same manner as in Example 1. The results are shown in Table 2.

TABLE 2

|  | Com. Ex. 1 | Com. Ex. 2 | Ex. 1 | Ex. 2 | Ex. 3 | Com. Ex. 3 |
|---|---|---|---|---|---|---|
| Prep. Ex. No. | 3 | 3 | 3 | 3 | 3 | 3 |
| Amount of VdF copolymer (g) | 9.0 | 10.8 | 12.6 | 14.4 | 16.2 | 18.0 |
| Amount of acryl (g) | 9.0 | 7.2 | 5.4 | 3.6 | 1.8 | 0.0 |
| Proportion of VdF copolymer (%) | 50 | 60 | 70 | 80 | 90 | 100 |
| $\Delta H_{MIX}$ (J/g) | 0 | 0 | 15 | 18 | 28 | 32 |
| Blocking resistance | 4 | 4 | 6 | 6 | 8 | 10 |
| Light transmittance | 97 | 97 | 96 | 96 | 91 | 87 |
| Scratch resistance | 2.5 | 2 | 2 | 2 | 1.5 | 1 |
| Hot water resistance | 82 | 91 | 94 | 93 | 88 | 86 |
| Resistance to gasoline | whitening occurred | passed | passed | passed | passed | passed |

From Table 2, it is known that when the weight percentage of the VdF copolymer in the resin film is not more than 60% by weight (Comparative Examples 1 and 2), heat of fusion of crystal $\Delta H_{MIX}$ is not recognized and blocking resistance is not at a practical level. Also it is known that when an acrylic polymer is not contained (Comparative Example 3), transparency of the resin film is lowered and scratch resistance is not at a practical level.

Examples 4 to 9 and Comparative Example 4

Solutions of resin mixture were prepared in the same manner as in Example 1 except that 14.4 g of the VdF copolymer obtained in Preparation Example shown in Table 3 and 3.6 g of PMMA were used. The obtained solutions of resin mixture were cooled to 25° C. and then spread over a polyester film with a doctor blade and dried at 150° C. for five minutes so that a dried film thickness became 50 μm. Thus resin films were produced.

With respect to those resin films, the same items as in Example 1 were measured in the same manner as in Example 1. The results are shown in Table 3.

TABLE 3

|  | Com. Ex. 4 | Ex. 4 | Ex. 5 | Ex. 6 | Ex. 7 | Ex. 8 | Ex. 9 |
|---|---|---|---|---|---|---|---|
| Prep. Ex. No. | 1 | 2 | 3 | 4 | 5 | 6 | 8 |
| VdF/TFE (% by mole) | 68/32 | 75/25 | 80/20 | 88/12 | 90/10 | 95/5 | 88/12 |
| $\Delta H_{MIX}$ (J/g) | 33 | 28 | 18 | 22 | 24 | 25 | 23 |
| Blocking resistance | 10 | 8 | 6 | 10 | 10 | 10 | 10 |
| Light transmittance (%) | 68 | 92 | 96 | 96 | 96 | 95 | 96 |

TABLE 3-continued

|  | Com. Ex. 4 | Ex. 4 | Ex. 5 | Ex. 6 | Ex. 7 | Ex. 8 | Ex. 9 |
|---|---|---|---|---|---|---|---|
| Scratch resistance (kg) | 2 | 2 | 2 | 2 | 2 | 2 | 2 |
| Hot water resistance (%) | 61 | 90 | 93 | 93 | 92 | 90 | 80 |
| Resistance to gasoline | impossible to judge | passed | passed | passed | passed | passed | passed |

From Table 3, it is known that when the VdF content of the VdF copolymer is 68% by mole (Comparative Example 4), a transparent resin film cannot be obtained. Also it is known that the copolymers (Examples 4 to 8) obtained by the dispersion polymerization (Preparation Examples 2 to 6) are advantageous as compared with the copolymer (Example 9) obtained by the emulsion polymerization (Preparation Example 8) from the viewpoint of hot water resistance.

Comparative Example 5

Into a 100 ml glass vessel were poured 36 g of methyl ethyl ketone, 4 g of methylcarbitol acetate, 10.8 g of VdF copolymer obtained in Preparation Example 3 and 7.2 g of polymethyl methacrylate (trade name PARALOID A-21 available from Rhom & Haas), and the mixture was stirred at 50° C. for two hours to obtain a solution of resin mixture. This solution of resin mixture was cooled to 25° C. and then spread over a polyester film with a doctor blade and dried at 150° C. for five minutes so that a dried film thickness became 50 μm. Thus a resin film (content of VdF copolymer: 60% by weight) was produced.

With respect to the obtained resin film, the same items as in Example 1 were measured in the same manner as in Example 1. The results are shown in Table 4. As shown in Table 4, a crystalline melting peak derived from the VdF copolymer was not recognized, and heat of fusion of crystal $\Delta H_{MIX}$ derived from the VdF copolymer was 0 J/g.

Examples 10 to 13

The resin films produced in the same manner as in Comparative Example 5 were subjected to heat treatment (annealing) in a 90° C. constant temperature vessel for a period of time shown in Table 4 to produce the resin films of Examples 10 to 13.

With respect to the obtained resin films, the same items as in Example 1 were measured in the same manner as in Example 1. The results are shown in Table 4.

From Table 4, it is known that crystallization of the VdF copolymer in the resin film advances by heat treatment and the heat of fusion of crystal $\Delta H_{MIX}$ derived from the VdF copolymer in the resin film is recognized. Further it is known that when the heat of fusion of crystal $\Delta H_{MIX}$ derived from the VdF copolymer is not less than 15 J/g, blocking resistance can be enhanced up to a level for practical use.

Comparative Example 6

Into a 100 ml glass vessel were poured 36 g of methyl ethyl ketone, 4 g of methylcarbitol acetate, 10.8 g of VdF homopolymer obtained in Preparation Example 7 and 7.2 g of PMMA (trade name PARALOID A-21 available from Rhom & Haas), and the mixture was stirred at 50° C. for two hours. However a solution of resin mixture dissolved uniformly completely could not be obtained, and finally a transparent film could not be produced from the solution of resin mixture.

According to the present invention, there can be provided the resin film being excellent in blocking resistance, scratch resistance, transparency, water resistance and chemical resistance and the member having the above-mentioned resin film as an outermost layer.

What is claimed is:

1. A resin film comprising a vinylidene fluoride copolymer and an acrylic polymer as essential components, in which a heat of fusion of crystal derived from the vinylidene fluoride copolymer in the resin film is from 15 to 30 J/g when measured with a differential scanning calorimeter, said vinylidene fluoride copolymer is prepared by dispersion polymerization in the presence of a fluorine-containing solvent, and light transmittance at 600 nm of 50 μm thick resin film is not less than 85%, and wherein said vinylidene fluoride copolymer comprises vinylidene fluoride, tetrafluoroethylene and as an optional component, a monomer copolymerizable therewith, and the content of vinylidene fluoride is from 70–98% by mole.

TABLE 4

|  | Com. Ex. 5 | Ex. 10 | Ex. 11 | Ex. 12 | Ex. 13 |
|---|---|---|---|---|---|
| Prep. Ex. No. | 3 | 3 | 3 | 3 | 3 |
| Heating (annealing) temp. (° C.) | 90 | 90 | 90 | 90 | 90 |
| Heating (annealing) time (Hr) | 0 | 3 | 6 | 12 | 24 |
| $\Delta H_{MIX}$ (J/g) | 0 | 18 | 20 | 21 | 23 |
| Blocking resistance | 4 | 6 | 8 | 10 | 10 |
| Light transmittance (%) | 97 | 97 | 96 | 96 | 95 |
| Scratch resistance (kg) | 2 | 2 | 2 | 2 | 2 |
| Hot water resistance (%) | 91 | 92 | 92 | 91 | 92 |
| Resistance to gasoline | passed | passed | passed | passed | passed |

2. The resin film of claim 1, which contains the vinylidene fluoride copolymer in an amount of from 70 to 90% by weight.

3. A member which has the resin film of claim 2 as an outermost layer and has a blocking resistance of at least six evaluated according to ASTM-D3003-94.

4. The resin film of claim 1, wherein said vinylidene fluoride copolymer comprises vinylidene fluoride, tetrafluoroethylene and as an optional component, a monomer copolymerizable therewith, and the content of vinylidene fluoride is from 70 to 78% by mole.

5. A member which has the resin film of claim 4 as an outermost layer and has a blocking resistance of at least six evaluated according to ASTM D3003-94.

6. A member which has the resin film of claim 1 as an outermost layer and has a blocking resistance of at least six evaluated according to ASTM D3003-94.

7. The resin film of claim 1, wherein said vinylidene fluoride copolymer comprises vinylidene fluoride, tetrafluoroethylene and as an optional component, a monomer copolymerizable therewith, and the content of vinylidene fluoride is from 82 to 92% by mole.

8. A member which has the resin film of claim 7 as an outermost layer and has a blocking resistance of at least six evaluated according to ASTM D3003-94.

9. A resin film comprising a vinylidene fluoride copolymer and an acrylic polymer as essential components, in which a heat of fusion of crystal derived from the vinylidene fluoride copolymer in the resin film is from 15 to 30 J/g when measured with a differential scanning calorimeter said vinylidene fluoride copolymer is prepared by dispersion polymerization in the presence of a fluorine-containing solvent, and light transmittance at 600 nm of 50 μm thick resin film is not less than 85%, and the acrylic polymer is a homopolymer of (meth)acrylic acid ester, and wherein said vinylidene fluoride copolymer comprises vinylidene fluoride, tetrafluoroethylene and as an optional component, a monomer copolymerizable therewith, and the content of vinylidene fluoride is from 70–98% by mole.

10. The resin film of claim 9, which contains the vinylidene fluoride copolymer in an amount of from 70 to 90% by weight.

11. A member which has the resin film of claim 10 as an outermost layer and has a blocking resistance of at least six evaluated according to ASTM D3003-94.

12. The resin film of claim 9, wherein said vinylidene fluoride copolymer comprises vinylidene fluoride, tetrafluoroethylene and as an optional component, a monomer copolymerizable therewith, and the content of vinylidene fluoride is from 70 to 78% by mole.

13. A member which has the resin film of claim 12 as an outermost layer and has a blocking resistance of at least six evaluated according to ASTM D3003-94.

14. The resin film of claim 9, wherein said vinylidene fluoride copolymer comprises vinylidene fluoride, tetrafluoroethylene and as an optional component, a monomer copolymerizable therewith, and the content of vinylidene fluoride is from 82 to 92% by mole.

15. A member which has the resin film of claim 14 as an outermost layer and has a blocking resistance of at least six evaluated according to ASTM D3003-94.

16. A member which has the resin film of claim 9 as an outermost layer and has a blocking resistance of at least six evaluated according to ASTM D3003-94.

* * * * *